(12) United States Patent
Alidedeoglu et al.

(10) Patent No.: US 9,334,360 B2
(45) Date of Patent: *May 10, 2016

(54) COLOR-STABILIZED BIODEGRADABLE ALIPHATIC-AROMATIC COPOLYESTERS, METHODS OF MANUFACTURE, AND ARTICLES THEREOF

(75) Inventors: Husnu Alp Alidedeoglu, Evansville, IN (US); Ganesh Kannan, Evansville, IN (US)

(73) Assignee: SABIC GLOBAL TECHNOLOGIES B.V. (NL)

(*) Notice: Subject to any disclaimer, the term of this patent is extended or adjusted under 35 U.S.C. 154(b) by 101 days.

This patent is subject to a terminal disclaimer.

(21) Appl. No.: 13/183,821

(22) Filed: Jul. 15, 2011

(65) Prior Publication Data

US 2013/0018130 A1    Jan. 17, 2013

(51) Int. Cl.
C08G 63/183    (2006.01)
C08G 63/20     (2006.01)
C08L 67/02     (2006.01)

(52) U.S. Cl.
CPC .............. *C08G 63/183* (2013.01); *C08G 63/20* (2013.01); *C08L 67/02* (2013.01)

(58) Field of Classification Search
USPC .......................... 524/537, 605; 528/308, 496
See application file for complete search history.

(56) References Cited

U.S. PATENT DOCUMENTS

| | | | |
|---|---|---|---|
| 2,012,267 A | 8/1929 | Carothers | |
| 2,780,609 A | 2/1957 | Petropoulos | |
| 2,830,966 A | 4/1958 | Petropoulos | |
| 2,873,262 A | 2/1959 | Petropoulos | |
| 3,102,135 A | 8/1963 | Petropoulos | |
| 3,522,215 A | 7/1970 | Sardessai et al. | |
| 3,535,286 A | 10/1970 | Stow et al. | |
| 3,547,888 A | 12/1970 | Sardessai et al. | |
| 3,634,089 A | 1/1972 | Hamb | |
| 3,669,921 A | 6/1972 | Droke et al. | |
| 3,769,264 A | 10/1973 | Wilson et al. | |
| 3,833,685 A | 9/1974 | Wambach | |
| 3,856,752 A | 12/1974 | Bateman et al. | |
| 3,951,886 A | 4/1976 | Miyake et al. | |
| 3,953,539 A | 4/1976 | Kawase et al. | |
| 3,989,664 A | 11/1976 | Kawase et al. | |
| 4,128,526 A | 12/1978 | Borman | |
| 4,178,277 A | 12/1979 | Gebauer et al. | |
| 4,328,059 A | 5/1982 | Horlbeck et al. | |
| 4,401,804 A | 8/1983 | Wooten et al. | |
| 4,452,933 A | 6/1984 | McCready | |
| 4,482,700 A | 11/1984 | Kuhnrich et al. | |
| 4,500,575 A | 2/1985 | Taira et al. | |
| 4,617,373 A | 10/1986 | Pruett et al. | |
| 4,659,615 A | 4/1987 | Ishii et al. | |
| 5,008,366 A | 4/1991 | Bathe | |
| 5,266,601 A | 11/1993 | Kyber et al. | |
| 5,268,420 A | 12/1993 | Nishimura et al. | |
| 5,271,985 A | 12/1993 | Tsunashima et al. | |
| 5,292,782 A | 3/1994 | Bastioli et al. | |
| 5,378,796 A | 1/1995 | George et al. | |
| 5,391,263 A | 2/1995 | Hepner et al. | |
| 5,391,362 A | 2/1995 | Reinalda et al. | |
| 5,413,681 A | 5/1995 | Tustin et al. | |
| 5,446,079 A | 8/1995 | Buchanan et al. | |
| 5,451,611 A | 9/1995 | Chilukuri et al. | |
| 5,453,479 A | 9/1995 | Borman et al. | |
| 5,466,777 A | 11/1995 | Caruso et al. | |
| 5,498,749 A | 3/1996 | Heise et al. | |
| 5,554,657 A | 9/1996 | Brownscombe et al. | |
| 5,559,159 A | 9/1996 | Sublett et al. | |
| 5,744,503 A | 4/1998 | Smith et al. | |
| 5,817,721 A | 10/1998 | Warzelhan et al. | |
| 5,844,023 A | 12/1998 | Tomka | |
| 5,866,710 A | 2/1999 | Ridland et al. | |
| 5,869,543 A | 2/1999 | Boos et al. | |
| 6,020,393 A | 2/2000 | Khemani | |
| 6,066,714 A | 5/2000 | Putzig et al. | |
| 6,096,809 A | 8/2000 | Lorcks et al. | |
| 6,120,895 A | 9/2000 | Kowitz et al. | |
| 6,133,404 A | 10/2000 | Kang et al. | |
| 6,166,170 A | 12/2000 | Putzig | |
| 6,201,034 B1 | 3/2001 | Warzelhan et al. | |
| 6,231,970 B1 | 5/2001 | Andersen et al. | |
| 6,235,815 B1 | 5/2001 | Loercks et al. | |
| 6,303,738 B1 | 10/2001 | Putzig et al. | |
| 6,383,729 B1 | 5/2002 | Ohnuma et al. | |
| 6,384,129 B1 | 5/2002 | Lowry | |
| 6,472,497 B2 | 10/2002 | Loercks et al. | |
| 6,472,557 B1 | 10/2002 | Pell, Jr. et al. | |
| 6,518,322 B1 | 2/2003 | West | |
| 6,521,717 B1 | 2/2003 | Itoh | |

(Continued)

FOREIGN PATENT DOCUMENTS

| | | |
|---|---|---|
| CA | 2266371 | 3/1999 |
| CN | 101346427 | 1/2009 |

(Continued)

OTHER PUBLICATIONS

JP60147430 Abstract; 1 page; Aug. 3, 1985.
U.S. Appl. No. 13/409,898, filed with USPTO on Mar. 1, 2012.
U.S. Appl. No. 13/409,983, filed with USPTO on Mar. 1, 2012.
U.S. Appl. No. 13/432,638, filed with USPTO on Mar. 29, 2012.
U.S. Appl. No. 13/433,390, filed with USPTO on Mar. 29, 2012.
U.S. Appl. No. 13/435,865, filed with USPTO on Mar. 30, 2012.
Chang et al.; "Copolyesters. VII. Thermal Transitions of Poly(butylene terephthalate-co-isophthalate-co-adipate)s"; vol. 51; Issue 6; Feb. 1994; pp. 999-1004.
English Abstract of EP0007445 A1; Date of Publication Feb. 6, 1980; 1 page.
English Abstract of EP0519367 A1; Date of Publication Sep. 2, 1998; 2 pages.
English Abstract of EP2258545 A1; Date of Publication Dec. 8, 2010; 2 pages.
English Abstract of JP2000109665 A; Date of Publication Apr. 18, 2000; 1 page.
English Abstract of JP2003220645 A; Date of Publication Aug. 5, 2003; 1 page.
English Abstract of JP2004050769 A; Date of Publication Feb. 19, 2004; 1 page.

(Continued)

*Primary Examiner* — Tae H Yoon
(74) *Attorney, Agent, or Firm* — Cantor Colburn LLP

(57) ABSTRACT

Biodegradable compositions containing an aliphatic-aromatic copolyester derived from aromatic polyesters. Methods of making the compositions and articles made from the compositions.

20 Claims, No Drawings

(56) References Cited

U.S. PATENT DOCUMENTS

| | | |
|---|---|---|
| 6,573,340 B1 | 6/2003 | Khemani et al. |
| 6,582,818 B2 | 6/2003 | Haile et al. |
| 6,649,731 B2 | 11/2003 | Hori et al. |
| 6,660,211 B2 | 12/2003 | Topolkaraev et al. |
| 6,703,115 B2 | 3/2004 | Hale et al. |
| 6,706,843 B1 | 3/2004 | Ishihara et al. |
| 6,713,595 B2 | 3/2004 | Chung et al. |
| 6,803,389 B2 | 10/2004 | Kawamura et al. |
| 6,841,597 B2 | 1/2005 | Bastioli et al. |
| 6,998,462 B2 | 2/2006 | Duan et al. |
| 7,037,959 B1 | 5/2006 | Willett et al. |
| 7,129,301 B2 | 10/2006 | Wu et al. |
| 7,160,977 B2 | 1/2007 | Hale et al. |
| 7,166,690 B2 | 1/2007 | Kim |
| 7,176,251 B1 | 2/2007 | Bastioli et al. |
| 7,241,832 B2 | 7/2007 | Khemani et al. |
| 7,241,838 B2 | 7/2007 | Shelby et al. |
| 7,354,653 B2 | 4/2008 | Germroth et al. |
| 7,368,503 B2 | 5/2008 | Hale |
| 7,368,511 B2 | 5/2008 | Hale et al. |
| 7,737,246 B2 | 6/2010 | Crawford |
| 7,799,836 B2 | 9/2010 | Agarwal et al. |
| 7,910,645 B2 | 3/2011 | Ahmed et al. |
| 8,038,658 B2 | 10/2011 | Kohama |
| 8,088,834 B2 | 1/2012 | Agarwal et al. |
| 8,557,945 B2 | 10/2013 | Xu et al. |
| 2001/0014388 A1 | 8/2001 | Bastioli et al. |
| 2002/0111409 A1 | 8/2002 | Talibuddin |
| 2004/0092672 A1 | 5/2004 | Bastioli et al. |
| 2004/0254330 A1 | 12/2004 | Duan et al. |
| 2005/0113534 A1 | 5/2005 | Agarwal et al. |
| 2005/0137304 A1 | 6/2005 | Strand et al. |
| 2006/0004151 A1 | 1/2006 | Shaikh et al. |
| 2006/0257676 A1 | 11/2006 | Itada et al. |
| 2007/0010648 A1 | 1/2007 | Partridge et al. |
| 2007/0066735 A1 | 3/2007 | Quillen et al. |
| 2007/0066794 A1 | 3/2007 | Jernigan |
| 2007/0079945 A1 | 4/2007 | Noda et al. |
| 2007/0082573 A1 | 4/2007 | Noda et al. |
| 2007/0082981 A1 | 4/2007 | Noda et al. |
| 2007/0093634 A1 | 4/2007 | Salsman et al. |
| 2007/0208160 A1 | 9/2007 | Agarwal et al. |
| 2007/0241483 A1 | 10/2007 | Bastioli et al. |
| 2007/0244242 A1 | 10/2007 | Agarwal et al. |
| 2007/0264460 A1 | 11/2007 | Del Tredici |
| 2007/0275242 A1 | 11/2007 | Gopal et al. |
| 2007/0276069 A1 | 11/2007 | Agarwal et al. |
| 2008/0039571 A1 | 2/2008 | Cohoon et al. |
| 2008/0274320 A1 | 11/2008 | Yokoyama et al. |
| 2008/0311385 A1 | 12/2008 | Miyazaki et al. |
| 2009/0169772 A1 | 7/2009 | Yamada et al. |
| 2009/0274885 A1 | 11/2009 | Egawa |
| 2009/0275698 A1 | 11/2009 | Ravi et al. |
| 2010/0041831 A1 | 2/2010 | Chung et al. |
| 2010/0168317 A1 | 7/2010 | Cahoon-Brister |
| 2010/0168336 A1 | 7/2010 | Cohoon-Brister |
| 2010/0168371 A1 | 7/2010 | Berti et al. |
| 2011/0003964 A1 | 1/2011 | Agarwal et al. |
| 2011/0034662 A1 | 2/2011 | Witt et al. |
| 2011/0071235 A1 | 3/2011 | Kannan et al. |
| 2011/0120346 A1 | 5/2011 | Reisacher et al. |
| 2011/0124821 A1 | 5/2011 | Agarwal et al. |
| 2011/0178265 A1 | 7/2011 | Tanaka et al. |
| 2012/0232191 A1 | 9/2012 | Auggermann et al. |
| 2013/0030116 A1 | 1/2013 | Okaniwa et al. |
| 2015/0057400 A1 | 2/2015 | Alidedeoglu et al. |
| 2015/0065610 A1 | 3/2015 | Alidedeoglu et al. |
| 2015/0073117 A1 | 3/2015 | Alidedeoglu et al. |
| 2015/0210803 A1 | 7/2015 | Alidedeoglu et al. |

FOREIGN PATENT DOCUMENTS

| | | |
|---|---|---|
| DE | 19638488 A1 | 3/1998 |
| EP | 0103531 B1 | 3/1984 |
| EP | 0331746 B1 | 6/1984 |
| EP | 0272417 A2 | 6/1988 |
| EP | 0573680 A1 | 12/1993 |
| EP | 0634435 A1 | 1/1995 |
| EP | 0736557 A1 | 2/2001 |
| EP | 1116746 A2 | 7/2001 |
| EP | 0575349 B2 | 8/2003 |
| EP | 1344765 A1 | 9/2003 |
| EP | 1347008 A2 | 9/2003 |
| EP | 1426404 A1 | 6/2004 |
| EP | 1437377 A1 | 7/2004 |
| EP | 147324 A1 | 11/2004 |
| EP | 1473324 A1 | 11/2004 |
| EP | 1229075 B1 | 10/2005 |
| EP | 1627893 A1 | 2/2006 |
| EP | 0950678 A1 | 12/2006 |
| EP | 1862507 A1 | 12/2007 |
| EP | 2003159 A1 | 12/2008 |
| EP | 2042548 A1 | 4/2009 |
| EP | 1947145 A2 | 12/2009 |
| GB | 1507358 | 4/1978 |
| GB | 2101617 A | 1/1983 |
| JP | 2002363391 | 12/2002 |
| JP | 2004098321 | * 4/2004 |
| JP | 2005060640 | 3/2005 |
| JP | 2007314743 A | 12/2007 |
| JP | 2009179740 | 8/2009 |
| JP | 2011093986 | 5/2011 |
| WO | 0039212 | 7/2000 |
| WO | 0185824 A2 | 11/2001 |
| WO | 02085969 A2 | 10/2002 |
| WO | 2005017034 A1 | 2/2005 |
| WO | 2007076384 A2 | 7/2007 |
| WO | 2007089598 A1 | 8/2007 |
| WO | 2007089600 A1 | 8/2007 |
| WO | 2008042384 A1 | 4/2008 |
| WO | 2008085396 A1 | 7/2008 |
| WO | 2009127556 A1 | 10/2009 |
| WO | 2010034711 A1 | 4/2010 |
| WO | 2010077809 A1 | 7/2010 |
| WO | 2011054786 A1 | 5/2011 |
| WO | 2013012706 A1 | 1/2013 |
| WO | 2013012707 A1 | 1/2013 |
| WO | 2013033285 A1 | 3/2013 |

OTHER PUBLICATIONS

English Abstract of JP2004098321 A; Date of Publication Apr. 2, 2004; 2 pages.
English Abstract of JP2004204038 A; Date of Publication; 1 page, Jul. 22, 2004.
English Abstract of JP2005052479 A; Date of Publication Mar. 3, 2005; 2 pages.
English Abstract JP2005220278 A; Aug. 18, 2005; 1 page.
English Abstract JP2008045117 A; Date of Publication Feb. 28, 2008; 2 pages.
English Abstract of JP3776578 B2; Date of Publication May 17, 2006; 1 page.
International Search Report for International Application No. PCT/JP2009/064418; International Date of Publication Nov. 10, 2009; Date of Mailing Nov. 17, 2009; 2 pages.
International Search Report for International Application No. PCT/US2012/026046; International Filing Date Feb. 22, 2012; Date of Mailing May 18, 2012.
Written Opinion of the International Search Report for International Application No. PCT/US2012/026046; Date of Mailing May 18, 2012; 8 pages.
International Search Report for International Application No. PCT/US2012/026048; Date Mailed May 18, 2012; 5 pages.
Written Opinion for International Application No. PCT/US2012/026048; Date Mailed May 18, 2012; 8 pages.
International Search Report for International Application PCT/US2012/020651; International Filing Date Feb. 22, 2012; Date of Mailing Aug. 3, 2012; 5 pages.
Written Opinion of the International Search Report for PCT/US2012/026051; International Filing Date Feb. 22, 2012; Date of Mailing Aug. 3, 2012; 9 pages.

(56) References Cited

OTHER PUBLICATIONS

International Search Report for International Application No. PCT/US2012/046625; International Filing Date Jul. 13, 2012; Date of Mailing Dec. 20, 2012; 4 pages.
Written Opinion of the International Search Report for International Application No. PCT/US2012/046625; International Filing Date Jul. 13, 2012; Date of Mailing Dec. 20, 2012; 6 pages.
International Search Report for International Application No. PCT/US2012/046627; International Filing Date Jul. 13, 2012; Date of Mailing Dec. 12, 2012.
Written Opinion of the International Search Report for International Application No. PCT/US2012/046627; International Filing Date Jul. 13, 2012; Date of Mailing Dec. 12, 2012.
International Search Report for International Application No. PCT/US2012/046629; International Filing Date Jul. 13, 2012; Date of Mailing Dec. 20, 2012; 4 pages.
Written Opinion of the International Search Report for International Application No. PCT/US2012/046629; International Filing Date Jul. 13, 2012; Date of Mailing Dec. 20, 2012; 6 pages.
International Search Report for International Patent Application No. PCT/US2012/052971; International Filing Date Aug. 30, 2012; Date of Mailing Dec. 10, 2012; 5 pages.
Written Opinion of the International Search Report for International Patent Application No. PCT/US2012/052971; International Filing Date Aug. 30, 2012; Date of Mailing Dec. 10, 2012; 7 pages.
Ukielski et al.; "Effect of Chemical Modification of Poly(butylene terephthalate) on elastic properties"; International Polymer Science and Technology, vol. 31, No. 3; Jan. 2004; 6 pages.
Witt et al.; "New Biodegradable Polyester-Copolymers from Commodity Chemicals with Favorable Use Properties"; Journal of Environmental Polymer Degradation; vol. 3; No. 4; no month, 1995; pp. 215-223.
U.S. Appl. No. 13/032,051, filed with USPTO on Feb. 22, 2011.
U.S. Appl. No. 13/032,091, filed Feb. 22, 2011.
U.S. Appl. No. 13/032,121, filed with USPTO on Feb. 22, 2011.
U.S. Appl. No. 13/183,786, filed with USPTO on Jul. 15, 2011.
U.S. Appl. No. 13/183,807; filed with USPTO on Jul. 15, 2011.
U.S. Appl. No. 13/221,159, filed with USPTO on Aug. 30, 2011.
U.S. Appl. No. 13/397,189, filed with USPTO on Feb. 15, 2012.
U.S. Appl. No. 13/397,200, filed with USPTO on Feb. 15, 2012.
U.S. Appl. No. 13/397,210, filed with USPTO on Feb. 15, 2012.
JP59138222A with English Abstract; Date of Publication Aug. 8, 1984; 7 pages.
JP9087370A with English Abstract; Date of Publication Mar. 31, 1997; 6 pages.
JP19840003496 English Abstract; Date of Publication Aug. 3, 1985; 2 pages.
Kleeberg et al.; "Biodegradation of Aliphatic-Aromatic copolyesters by Thermomonospora fusca and Other Thermophilic Compost Isolates"; Applied and Environmental Microbiology; vol. 64, No. 5; 1998, American Society for Microbiology; pp. 1731-1735.
International Search Report for International Patent Application No. PCT/US2012/068913; International Filing Date Dec. 11, 2012; Date of Mailing Mar. 25, 2013; 5 pages.
International Search Report of International Patent Application No. PCT/US2012/068907; International Date of Filing Dec. 11, 2012; Date of Mailing Mar. 25, 2013; 5 pages.
Written Opinion of the International Search Report for International Patent Application No. PCT/US2012/068907; International Date of Filing Dec. 11, 2012; Date of Mailing Mar. 25, 2013; 8 pages.
International Search Report of International Patent Application No. PCT/US2012/068909; International Filing Date Dec. 11, 2012; Date of Mailing Mar. 21, 2013; 5 pages.
Written Opinion of the International Search Report for International Patent Application No. PCT/US2012/068909; International Filing Date Dec. 11, 2012; Date of Mailing Mar. 21, 2013; 7 pages.
Written Opinion of the International Search Report for International Patent Application PCT/US2012/068913; International Date of Filing Dec. 11, 2012; Date of Mailing Mar. 25, 2013; 8 pages.
International Search Report for International Application No. PCT/US2012/071908; International Date of Filing Dec. 28, 2012; Date of Mailing May 7, 2013; 5 pages.
Written Opinion of the International Search Report for International Application No. PCT/US2012/071908; International Date of Filing Dec. 28, 2012; Date of Mailing May 7, 2013; 8 pages.
DE 19638488 A1 English Abstract; Date of Publication Mar. 26, 1998 2 pages.
International Search Report for International Application No. PCT/US2012/071902; International Filing Date: Dec. 28, 2012; Date of Mailing Jun. 24, 2013; 5 pages.
Written Opinion of the International Search Report for International Application No. PCT/US2012/071902; International Filing Date: Dec. 28, 2012; Date of Mailing Jun. 24, 2013; 7 pages.
International Search Report for International Application No. PCT/US2012/071904; International Filing Date Dec. 28, 2012; Date of Mailing Jun. 24, 2013; 5 pages.
Written Opinion of the International Search Report for International Application No. PCT/US2012/071904; International Filing Date Dec. 28, 2012; Date of Mailing Jun. 24, 2013; 6 pages.
WO 2009127556 A1 English Abstract; Date of Publication Oct. 22, 2009; 2 pages.
WO 2011054786 A1 English Abstract; Date of Publication May 12, 2011; 1 page.
Patent Cooperation Treaty; International Preliminary Report on Patentability; PCT/US2012/052971; Date of mailing: Mar. 13, 2014, 7 pages.
Scheirs et al.; "Modern Polyesters: Chemistry and Technology of Polyesters and Copolyesters"; 2003; pp. 293-321.
Fortunato et al.; Inhibiting Effect of Phosphorus Compounds on Model Transesterification and Direct Esterification Reactions Catalysed by Titanium Tetrabutylate: 2; Polymer, vol. 35, No. 18; 1994; pp. 4006-4010.
Non-Final Office Action dated Sep. 24, 2015 for U.S. Appl. No. 14/529,651, filed Oct. 31, 2014; 46 pages.
Non-Final Office Action dated Nov. 4, 2015 for U.S. Appl. No. 14/538,098, filed Nov. 11, 2014; 62 pages.
Non-Final Office Action dated Dec. 1, 2015 for U.S. Appl. No. 14/676,977, filed Apr. 2, 2015; 22 pages.

* cited by examiner

COLOR-STABILIZED BIODEGRADABLE ALIPHATIC-AROMATIC COPOLYESTERS, METHODS OF MANUFACTURE, AND ARTICLES THEREOF

BACKGROUND

This invention relates to biodegradable aliphatic-aromatic copolyester compositions, and methods of manufacture of the copolyesters and compositions. These copolyesters and compositions are useful as molded or extruded plastic objects, films, and fibers. More particularly, this invention relates to biodegradable aliphatic-aromatic copolyester compositions, specifically poly(butylene-co-adipate terephthalate) copolyester compositions that are white in color and useful in various applications.

U.S. Pat. No. 6,020,393 discloses a branched, random aliphatic-aromatic copolyester suitable for foaming into biodegradable disposable articles, including poly(butylene-co-adipate terephthalate) (PBAT). U.S. Pat. No. 6,201,034 discloses processes for preparing PBAT by reacting dimethyl terepthalate (DMT) or terephthalic acid (TPA) and adipic acid (AA) with butanediol (BDO). The biodegradability is induced by the incorporation of adipic acid in poly(butylene terephthalate) (PBT). The polymer thus made has a typical melting point ($T_m$) of about 109° C., and a glass transition temperature (Tg) between –25 to –30° C. The polymerization is conducted using a transesterification (TE) catalyst such as a titanium or tin compound.

The present inventors have observed that biodegradable aliphatic-aromatic copolyester product obtained in such a reaction was discolored, often ranging from pink to red in color. This presents a problem in that the aesthetic appearance of a non-white polymer product is an obstacle to employing the polymer in end-uses where the discoloration is apparent and cannot be readily overcome or masked with pigments, whitening agents or fillers. For at least the foregoing reasons, there remains a long unfelt need to develop processes that produce useful biodegradable aliphatic-aromatic copolyesters.

BRIEF DESCRIPTION OF THE INVENTION

A biodegradable aliphatic-aromatic copolyester comprises aliphatic ester groups and aromatic dicarboxylic ester groups, and comprising a polymerization reaction product of:
(a) a dihydric alcohol;
(b) an aromatic dicarboxy compound selected from an aromatic dicarboxylic acid, aromatic dicarboxylic (C1-3) alkyl ester, or a combination thereof;
(c) an adipic acid; and
(d) a color reducing compound selected from a $C_{5-12}$ compound having at least three —OH groups, methyl salicylate, and a combination thereof;
wherein the aliphatic-aromatic copolyester has a number average molecular weight of at least 20,000 Daltons and a polydispersity index from 2 to less than 6;
wherein the copolyester has a whiteness of at least L*=68.7; a*=20.5; b*=38.2 as determined by a colorimeter using D65 illumination.

In another embodiment, a process for making a biodegradable copolyester comprises:
(a) reacting
(1) an aromatic dicarboxy compound selected from an aromatic dicarboxylic acid, aromatic dicarboxylic (C1-3) alkyl ester, or a combination thereof,
(2) an adipic acid component selected from adipic acid, adipic acid oligomers, and combinations thereof, and
(3) a dihydric alcohol, in the presence of
(4) a color reducing compound selected from a $C_{5-12}$ compound having at least three —OH groups, methyl salicylate, and combinations thereof,
at a temperature from 160° C. to less than 250° C. to form a reaction mixture; and
(b) subjecting the reaction mixture to vacuum distillation at a pressure of less than 2×Torr and a temperature of 220 to less than 260° C., to form a molten copolyester.

In an embodiment, the aromatic dicarboxylic ester groups comprise the polymerization product of terephthalic acid and the dihydric alcohol. In another embodiment, the aromatic dicarboxylic ester groups comprise the polymerization product of dimethyl terephthalate derived from recycled PET and the dihydric alcohol, and further wherein the copolyester further comprises a dimethyl terephthalate residual composition.

In a further embodiment, the dimethyl terephthalate residual composition comprises
(a) dimethyl terephthalate, and
(b) more than 0 to less than 10 wt % of a residual component selected from dimethyl isophthalate, cyclohexane dimethanol, diethylene glycol, triethylene glycol, and a combination thereof.

The invention also relates to articles made from the compositions described above, e.g., films or sheets.

These and other features, aspects, and advantages of the present invention will become better understood with reference to the following description and appended claims.

DETAILED DESCRIPTION OF THE INVENTION

Our invention is based on the discovery that it is now possible to produce a biodegradable aliphatic-aromatic copolyester that is white in color in a process which quenches the polymerization reaction with a color reducing compound selected from a $C_{5-12}$ compound having at least three —OH groups, methyl salicylate, and combinations thereof.

In an embodiment, the biodegradable composition can also be made with renewable materials such as adipic acid, sebacic acid, and bio-glycols such as bio-1,3-propane diol. By using a specific combination of stabilizers, we have discovered that we can also make a biodegradable aliphatic-aromatic copolyester composition having a white color, which is extremely useful for film packaging applications.

The term "white," as used in this application, means that the material being described as white exhibits an L* value that is at least 68, or at least 80, or at least 85 with a corresponding set of "a" and "b" values that are substantially close to 0, (less than 5 units on the CIE color scale), where the "a" represents red and green hues and "b" represents blue and yellow hues of the white material on the CIE LAB color scale. The L* value can range from 68, or 80, or 85 to 100. The "L*, a, b" method for describing colors is will known and developed by the CIE (Commission Internationale de l'Eclairage). The CIE provides recommendations for colorimetry by specifying the illuminants, the observer and the methodology used to derive values for describing color 3 coordinates are utilized to locate a color in a color space which is represented by L*, a* and b*. When a color is expressed in CIELAB, L* defines lightness, if a value is closer to 0 it means total absorption or how dark a color is. If the L* value is closer to 100 it means total reflection or how light a color is. a* denotes how green or red a color is, whereas b* represents how blue or yellow a color is.

The term "recycle" as used herein refers to any component that has been manufactured and either used or intended for scrap. Thus, a recycle polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived from a biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived poly(ethylene terephthalate) is derived from reactants that are themselves derived from petroleum.

The singular forms "a," "an," and "the" include plural referents unless the context clearly dictates otherwise. Further unless defined otherwise, technical, and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "random copolymer," as used in this application refers to a copolymer that includes macromolecules in which the probability of finding a given monomeric unit at any given site in the chain is independent of the nature of the adjacent units.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group," "isophthalic acid group," "ethylene glycol group," "butanediol group," and "diethylene glycol group" being used to indicate, for example, the weight percent (wt. %) of the group in a molecule, the term "isophthalic acid group(s)" means the group or residue of isophthalic acid having the formula ($-O(CO)C_6H_4(CO)-$), the term "terephthalic acid group" means the group or residue of isophthalic acid having the formula ($-O(CO)C_6H_4(CO)-$), the term "diethylene glycol group" means the group or residue of diethylene glycol having the formula ($-O(C_2H_4)O(C_2H_4)-$), the term "butanediol group" means the group or residue of butanediol having the formula ($-O(C_4H_8)-$), and the term "ethylene glycol group" means the group or residue of ethylene glycol having the formula ($-O(C_2H_4)-$).

The preparation of polyesters and copolyesters is well known in the art, such as disclosed in U.S. Pat. No. 2,012,267. Such reactions are typically operated at temperatures from 150° C. to 300° C. in the presence of polycondensation catalysts such as titanium isopropoxide, manganese diacetate, antimony oxide, dibutyl tin diacetate, zinc chloride, or combinations thereof. The catalysts are typically employed in amounts between 10 to 1000 parts per million (ppm), based on total weight of the reactants The dihydric alcohol groups incorporated into the copolyester can be derived from any dihydric alcohol that reacts with the aliphatic dicarboxylic acid and the aromatic dicarboxylic acid to form the copolyester. Examples of suitable dihydric alcohols can include ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), bio-derived diols, hexylene glycols, and a combination thereof. In another embodiment, the dihydric alcohol is selected from 1,4-butanediol, 1,3-propanediol, ethylene glycol, and combinations thereof.

Any of the foregoing dihydric alcohols can be derived from a biological source. In an embodiment all or a portion of the dihydric alcohols are derived from a biological source. "Bio-derived diols" as used herein refers to alcohols other than those named and derived from a biological source, e.g., various pentoses, hexoses, and the like.

The aliphatic-aromatic copolyester contains aromatic dicarboxylic acid groups incorporated into the copolyester when the aromatic polyester reacts with the dihydric alcohol and the aliphatic dicarboxylic acid under conditions sufficient to form the copolyester. Examples of the aromatic dicarboxylic acid group include isophthalic acid groups, terephthalic acid groups, naphthalic acid groups and a combination thereof. The aromatic dicarboxylic group in the polyester may also be derived from corresponding diacid halides or di($C_1$ to $C_3$)alkyl esters. In a preferred embodiment, the aromatic dicarboxylic acid group is derived from terephthalic acid or the diacid halide or di($C_1$-$C_3$)alkyl ester thereof.

The aliphatic dicarboxylic acid group is incorporated into the copolyester when the aliphatic dicarboxylic acid reacts with the dihydric alcohol and aromatic carboxylic acid to form the copolyester. Examples of the aliphatic dicarboxylic acid include components having the general formula $(CH_2)_m(COOH)_2$, where m is an integer from 2 to 10. The aliphatic dicarboxylic acid can be decanedioic acid, adipic acid, or sebacic acid. When the aliphatic dicarboxylic acid is adipic acid, the value of m is 4. When the aliphatic dicarboxylic acid is sebacic acid, the value m is 8. In an embodiment all or a portion of the aliphatic dicarboxylic acid is a bio-derived aliphatic dicarboxylic acid.

In another embodiment, the aromatic dicarboxylic ester groups comprise the polymerization product of dimethyl terephthalate derived from recycled PET and the dihydric alcohol, and further wherein the copolyester further comprises a dimethyl terephthalate residual composition. Processes for recovering dimethyl terephthalate, also referred to as DMT or the dimethyl ester of terephthalic acid, are known in the art, for example as set forth in U.S. Pat. No. 6,472,557 and other patents disclosed therein, which disclosure is incorporated herein by reference. Typically, the polyethylene terephthalate is reacted at elevated temperature and suitable conditions with an alcohol, such as methanol, to break the ester linkages of the polyester and yield the corresponding diesters of the terephthalic acid, such as dimethyl terephthalate.

Accordingly, in an embodiment, a dimethyl terephthalate residual composition includes residual components selected from dimethyl isophthalate, cyclohexane dimethanol, diethylene glycol, triethylene glycol, and a combination thereof in amounts of from more than 0 to less than 10 weight percent based on the dimethyl terephthalate.

The relative amounts of the aromatic dicarboxylic acid group and the aliphatic dicarboxylic acid group can vary. In an embodiment, the aromatic dicarboxylic group and the aliphatic dicarboxylic group have an aromatic dicarboxylic group:aliphatic dicarboxylic group mole ratio from 0.6:1 to 6:1. In another embodiment, the aromatic dicarboxylic group and the aliphatic dicarboxylic group are present at an aromatic dicarboxylic group:aliphatic dicarboxylic group mole ratio from 0.6:1 to 1.3:1.

The processes and compositions according to the invention include a color-reducing amount of a $C_{5-12}$ compound having at least three hydroxyl groups, at least one hydroxyl group and two carboxylic acid groups, or at least two hydroxy groups and one carboxylic acid group.

Preferably, the color-reducing compound is selected from sorbitol, mannitol, xylitol, pentaerythritol, ascorbic acid, malic acid, methyl salicylate, and combinations thereof. In another embodiment, the color-reducing polyol is selected from sorbitol, mannitol, and combinations thereof.

The copolyester generally has a number average molecular weight of at least 20,000 Daltons and a polydispersity index from 2 to less than 6, specifically 2 to 5. In an embodiment, the copolyester has a glass transition temperature (Tg) from −35° C. to 0° C. In another embodiment, the copolyester has a melting temperature (Tm) from 90° C. to 160° C.

The copolyester can also be made with additional materials that can be present during any of the manufacturing steps, or added after formation of the molten copolyester, or after cooling of the molten copolyester.

In another optional embodiment, the molten copolyester is further reacted with an addition copolymer comprising the residue of a glycidyl ester monomer for an effective time, for example at least 5 minutes, specifically from 5 minutes to two hours. In this embodiment, the aliphatic-aromatic copolyester further comprises a residue of the addition copolymer, either associated with the copolymer or covalently bound to the copolymer. Examples of the an addition copolymer based on a glycidyl monomer include an addition copolymer comprising the residue of glycidyl acrylate, glycidyl methacrylate, or a combination thereof and the residue of methyl methacrylate, methyl acrylate, styrene, alpha-methyl styrene, butyl methacrylate butyl acrylate, or combinations thereof, for example styrene and methyl methacrylate. The addition copolymer can be present in an amount from 0 to 1.50 wt. % of the molten copolyester. Reacting can be at a temperature of, for example, less than or equal to 250° C.

The biodegradable composition includes, in addition to the copolyester, other components combined with the copolyester, for example other polymers and additives, for example additives used in the formulation of molding compositions. Examples of the polymers include aliphatic polyesters, aromatic polycarbonates, aliphatic polycarbonates, starches, aromatic polyesters, cycloaliphatic polyesters, polyesteramides, combinations thereof, and the like. The polymers can be wholly or partially bio-derived, including petroleum-derived aromatic polyesters and bio-derived aromatic polyesters. In the art, chain extenders such as epoxides, bisoxazolines, bis-caprolactams, dianhydrides, etc. have been reported for use in polyesters. Among these, epoxides are most widely used on a commercial scale due to their relatively low cost and availability of a variety of structures.

In a specific embodiment the copolyester is combined with an aliphatic polyester, for example poly(lactic acid), poly(hydroxyalkanoate), poly(butylene succinate), poly(butylene adipate), poly(butylene succinate adipate) and poly(caprolactone), or a combination thereof. Polyhydroxyalkanoates (PHAs) are linear polyesters produced in nature by bacterial fermentation of sugar or lipids, and include, for example, poly(R-3-hydroxybutyrate) (PHB or poly(3HB)).

In another specific embodiment the copolyester is combined with an aromatic polyester, for example a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, or a combination thereof.

The amounts of the copolyesters and the additives, for example a polymer can vary depending on the desired properties of the biodegradable composition. In an embodiment the additives are present in an amount from 2 to 90 wt. %, for example from 2 to 40 wt. % or from 40 to 90 wt. %, based on the total weight of the composition. When the copolyester is used with starch, the amount of starch can range from 40 to 90 wt. %, and the amount of polyester can range from 10 to 60%, based on the total weight of the total composition. When the copolyester is used in conjunction with polylactic acid, the amount of the copolyester can range from 40 to 90 wt % and the amount of polylactic acid can range from 10 to 60 wt %, specifically 40 to 60%, based on the total weight of the composition.

The composition may also contain from 0.01 to 45 wt. %, based on the total weight of the composition, of an additive selected from alcohols, acetates, alcohol-acetate copolymers, and combinations thereof. Additionally, the composition may contain from 0.01 to 2 wt. %, based on the weight of the composition, of an additive selected from crosslinkers, anti-aging agents, retrogradation agents, anti-blocking agents, water, odor-controlling agents, and combinations thereof.

Additives ordinarily incorporated into polymer compositions can be used, with the proviso that the additives are selected so as to not significantly adversely affect the desired properties of the composition, for example, biodegradability, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, anti-static agents, colorants, blowing agents, flame retardants, anti-drip agents, and radiation stabilizers. Combinations of additives can be used, for example an antioxidant, a UV absorber, and a mold release agent. The total amount of additives (other than any impact modifier, filler, or reinforcing agents) is generally 0.01 to 5 wt. %, based on the total weight of the composition. In a specific embodiment, from 0.01 to 5.00 wt. % of a nucleating agent, antioxidant, UV stabilizer, plasticizers, epoxy compound, melt strength additive, or a combination thereof is used.

Advantageously, the copolyester and compositions containing the copolyester can be biodegradable. This means that the copolyester and compositions containing the copolyester exhibit aerobic biodegradability, as determined by ISO 14855-1:2005. ISO 14855-1:2005, as is known, specifies a method for the determination of the ultimate aerobic biodegradability of plastics, based on organic compounds, under controlled composting conditions by measurement of the amount of carbon dioxide evolved and the degree of disintegration of the plastic at the end of the test. This method is designed to simulate typical aerobic composting conditions for the organic fraction of solid mixed municipal waste. The test material is exposed to an inoculum, which is derived from compost. The composting takes place in an environment wherein temperature, aeration and humidity are closely monitored and controlled. The test method is designed to yield the percentage conversion of the carbon in the test material to evolved carbon dioxide as well as the rate of conversion. Also specified is a variant of the method, using a mineral bed (vermiculite) inoculated with thermophilic microorganisms obtained from compost with a specific activation phase, instead of mature compost. This variant is designed to yield the percentage of carbon in the test substance converted to carbon dioxide and the rate of conversion. Generally, the copolyesters (and compositions containing copolyesters) exhibit a biodegradation (measured in % of solid carbon of the test item that is converted into gaseous, mineral C in the form of $CO_2$), which is at least 30% after 75 days. In an embodiment, the copolyesters (and compositions containing copolyesters) exhibit a biodegradation, which is at least 40% or 50% after 75 days. The biodegradation of the copolyesters (and compositions containing copolyesters) can range from at least 30% to 50%, or at least 30% to 60%, or at least 30% to 70%.

Advantageously, useful articles can be made from the copolyester and compositions containing the copolyester. In a specific embodiment, an article is extruded, calendared, extrusion molded, blow molded, solvent cast or injection molded from the copolymer or the composition containing the copolymer. The article can be a film or a sheet. When the article is a film, the article can be formed by extrusion molding or calendaring the copolyester or composition containing the copolyester. The copolyesters and compositions containing the copolyesters are useful for films, for example film packaging applications, among other applications.

As stated above, various combinations of the foregoing embodiments can be used.

The invention is further described in the following illustrative examples in which all parts and percentages are by weight unless otherwise indicated.

EXAMPLES

Following is a list of materials, acronyms, and selected sources used in the examples.

ADA: Adipic Acid (from INVISTA)
BDO: 1,4-Butanediol (from BASF, with a purity specification of 99.5 wt. %)
D-sorbitol: D-Sorbitol (from Sigma Aldrich)
Methyl salicylate: methyl salicylate (from Aldrich)
TPA: Terephthalic acid (from Acros)
TPT: Tetraisopropyl titanate (from DuPont, commercial Tyzor grade)
PBT-co-adipate: Poly(butylene terephthalate)-co-adipate
PET: Poly(ethylene terephthalate)
Recycled DMT: Prepared by methanolysis of Recycle PET
Recycle PET: Recycle PET in the form of flakes or pellets was obtained from a commercial vendor headquartered in India.

Comparative Example A and Examples 1-4

The purpose of Comparative Example A was to prepare PBT-co-adipate derived from terephthalic acid (TPA), 1,4-butanediol (BDO), and adipic acid (ADA). The purpose of Examples 1-2 was to prepare PBT-co-adipate derived from TPA, ADA, BDO, and D-sorbitol as a catalyst quencher. The purpose of Examples 3-4 was to prepare PBT-co-adipate derived from ADA, BDO, and D-sorbitol as a catalyst quencher, and recycled DMT prepared through the methanolysis of post consumer poly(ethylene terephthalate) (PET). The amounts and reaction conditions are shown in Table 1.

TABLE 1

Materials and Conditions for Comparative Example A and Examples 1-4

| Ex. No. | Scale of Reaction (g) | Aromatic Diacid:BDO (mol/mol) | ADA:BDO (mol/mol) | Ti (ppm) | EI Temp. (° C.) | EI Time (min) | Poly Temp. (° C.) | Poly Time (min) |
|---|---|---|---|---|---|---|---|---|
| A* | 143 | 0.39 | 0.39 | 250 | 220 | 32 | 250 | 29 |
| 1 | 143 | 0.39 | 0.39 | 250 | 220 | 34 | 250 | 64 |
| 2 | 143 | 0.39 | 0.39 | 250 | 220 | 31 | 230 | 81 |
| 3 | 143 | 0.39 | 0.39 | 250 | 220 | 28 | 250 | 38 |
| 4 | 143 | 0.39 | 0.39 | 250 | 220 | 28 | 230 | 90 |

*Comparative

Techniques and Procedures

Comparative Example A

The polyester PBT-co-adipate was prepared as a comparative without using an additive. Accordingly, 41.5 g of TPA, 36.5 g of ADA and 58 g of BDO were introduced into a three neck round bottom flask. The reactor was placed in an oil bath, the temperature of which was adjusted to 170° C. Next, 250 ppm of tetraisopropyl titanate (TPT) was added to the reaction mixture and the ester interchange ("EI" in Table 1) temperature was increased to 220° C. at a rate of 2° C./min while stirring at 260 rpm under nitrogen. The evolved water/ethylene glycol mixture was collected separately. The reactor temperature was increased and held at 250° C. and the polymerization ("Poly" in Table 1) was initiated with the vacuum adjusted to below 1 Torr for 30 minutes. At the end of the polymerization, the vacuum was released. Resulting polymer exhibited red color.

Example 1

The polyester PBT-co-adipate (Example 1) was prepared using D-sorbitol as a catalyst quencher. Accordingly, 41.5 g of TPA, 36.5 g of ADA and 58 g of BDO were introduced into a three neck round bottom flask. The reactor was placed in an oil bath, the temperature of which was adjusted to 170° C. Next, 250 ppm of TPT was added to the reaction mixture and the ester interchange ("EI" in Table 1) temperature was increased to 220° C. at a rate of 2° C./min while stirring at 260 rpm under nitrogen. The evolved water/ethylene glycol mixture was collected separately. The temperature of the reaction mixture was further increased to 250° C. and the polymerization ("Poly" in Table 1) was initiated with the vacuum adjusted to below 1 Torr for 1 hour. At the end of the polymerization, the vacuum was released. 450 ppm of D-sorbitol was added to the melt and the mixture was agitated for 2 minutes under nitrogen. The resulting polymer exhibited white color.

Example 2

The polyester PBT-co-adipate (Example 2) was prepared using D-sorbitol as a catalyst quencher. Accordingly, 41.5 g of TPA, 36.5 g of ADA and 58 g of BDO were introduced into a three neck round bottom flask. The reactor was placed in an oil bath, the temperature of which was adjusted to 170° C. Next, 250 ppm of TPT was added to the reaction mixture and the ester interchange ("EI" in Table 1) temperature was increased to 220° C. at a rate of 2° C./min while stirring at 260 rpm under nitrogen. The evolved water/ethylene glycol mixture was collected separately. The temperature of the reaction mixture was further increased to 230° C. and the polymerization ("Poly" in Table 1) was initiated with the vacuum adjusted to below 1 Torr for 1 hour. At the end of the polymerization, the vacuum was released. 300 ppm of D-sorbitol was added to the melt and the mixture was agitated for 6 minutes under nitrogen.

Example 3

The purpose of Example 3 was to understand the effect on the final color of the polymer prepared from recycled DMT. Accordingly, PBT-co-adipate (Example 3) were synthesized as described for Examples 1 and 2, except that instead of TPA, recycled DMT prepared through the methanolysis of the post consumer PET was introduced in reaction vessel. The polymerization temperature was 250° C. with the vacuum adjusted to below 1 Torr. At the end of the polymerization, the vacuum was released. 450 ppm of D-sorbitol was added to the melt and the mixture was agitated for 2 minutes under nitrogen.

Example 4

The purpose of Example 4 was to demonstrate the effect of the catalyst quencher at low polymerization temperature. The PBT-co-adipate (Examples 4) was synthesized as described for Example 2, except that recycled DMT prepared through the methanolysis of the post consumer PET was introduced in the reaction vessel. At the end of the polymerization, 300 ppm of D-sorbitol was added to the melt and the mixture was agitated for 2 minutes under nitrogen.

Results

Table 2 shows the glass transition temperature (Tg), melting temperature (Tm) (obtained from DSC), molecular weight data (obtained from gel permeation chromatography (GPC)), intrinsic viscosity (IV), and color obtained from visual observation of Comparative Example A and Examples 1-4.

TABLE 2

Results for Examples 1-5.

| Ex. No. | Quencher | Quencher Amount (ppm) | IV (dL/min) | $T_m$ (° C.) | $T_g$ (° C.) | PDI | Mn | Mw | L* | *a | *b |
|---|---|---|---|---|---|---|---|---|---|---|---|
| A | No | 0 | 1.2 | 134 | −27 | 3.4 | 29000 | 108000 | 68.7 | 0.5 | 8.2 |
| 1 | D-Sorbitol | 450 | 1.1 | 136 | −27 | 3.8 | 32000 | 125000 | 86.5 | 8.7 | 7.6 |
| 2 | D-Sorbitol | 300 | 1.0 | 134 | −27 | 3.3 | 30000 | 100000 | 90.3 | 2.4 | .1 |
| 3 | D-Sorbitol | 450 | 1.0 | 132 | −29 | 3.3 | 27000 | 88000 | 73.0 | 0.6 | 8.3 |
| 4 | D-Sorbitol | 300 | 0.9 | 133 | −27 | 3.3 | 26000 | 84000 | 66.4 | .6 | 2.0 |

Discussion

EP 02 72417 teaches the use of polyols as a color stabilizer for copolyester compositions, in particular that various polyols having a formula of R—(OH)$_x$ can be used to quench titanium catalyst, leading to white copolyesters. In Examples 2 and 4, D-sorbitol was used to quench titanium catalyst in the copolyester melt after polymerization at 230° C. Without being bound by theory, it is believed that because the pKa values of D-sorbitol are close to 7, the molecular weight degradation of the polymer due to the hydrolysis was prevented. As shown in Table 2, the use of polyol quenchers in the current process provides white copolyester while maintaining the molecular weight of the copolyester.

However, as shown by Examples 1 and 3, after polymerization at 250° C., a yellow coloration was observed. Increasing the polyol concentration in the quenching process did not have any effect on the elimination of the yellow color. Again without being bound by theory, it is believed that this can be explained by thermal degradation of the copolyester by hydrogen abstraction from a methylene carbon at the higher polymerization temperature, leading to double bond formation which complexes with titanium catalyst.

The molecular weights and melting temperature of Examples 1-4 are similar to those of the commercially available PBT-co-adipate. However, the polydispersity of resulting copolyesters are lower compared to the commercially available PBT-co-adipate.

Example 5

The purpose of Examples 5 was to manufacture PBT-co-adipate derived from TPA, 1,4-butanediol (BDO), and adipic acid (ADA) in accordance with the invention on a laboratory scale using methyl salicylate as an organic quencher. The materials, amounts, and reaction conditions are shown in Table 3.

TABLE 3

Materials and Conditions for Example 5

| Ex. No. | Scale of Reaction (g) | TPA:BDO (mol/mol) | ADA:BDO (mol/mol) | Ti (ppm) | EI Temp. (° C.) | EI Time (min) | Poly Temp. (° C.) | Poly Time (min) |
|---|---|---|---|---|---|---|---|---|
| 5 | 143 | 0.39 | 0.39 | 250 | 220 | 35 | 250 | 40 |

Techniques and Procedures

The purpose of Example 5 was to determine the effect of a higher polymerization temperature (250° C.) and polyol concentration on the final color of the polymer. Accordingly, PBT-co-adipate (Example 5) was synthesized as described for Examples 2-3, except at the polymerization temperature of 250° C. with the vacuum adjusted to below 1 Torr. At the end of the polymerization, the vacuum was released and 450 ppm of methyl salicylate was added to the melt and the mixture was agitated for 6 minutes under nitrogen.

Results

Table 4 shows the glass transition temperature (Tg), melting temperature (Tm) obtained from DSC, molecular weight data obtained from gel permeation chromatography (GPC), intrinsic viscosity (I.V.), color (L*, a*, b* values obtained through the diffuse reflectance method acquired on a Gretag Macbeth Color-Eye 7000A with D65 illumination) of Example 5.

TABLE 4

Results for Example 5.

| Ex. No. | Quencher | Quencher Amount (ppm) | IV (dL/min) | $T_m$ (° C.) | $T_g$ (° C.) | PDI | Mn | Mw | L* | a* | b* |
|---|---|---|---|---|---|---|---|---|---|---|---|
| 5 | Methyl Salicylate | 450 | 0.67 | 135 | −28 | 3.1 | 19000 | 57000 | 59.0 | 16.6 | 22.7 |

Discussion

Example 5 shows that methyl salicylate can be used as catalyst quencher. This quencher removes color from the resin body.

All cited patents, patent applications, and other references are incorporated herein by reference in their entirety.

Although the present invention has been described in detail with reference to certain preferred versions thereof, other variations are possible. Therefore, the spirit and scope of the appended claims should not be limited to the description of the versions contained therein.

What is claimed is:

1. A biodegradable aliphatic-aromatic copolyester composition consisting of copolyester having aliphatic ester groups and aromatic dicarboxylic ester groups, wherein the copolyester is a polymerization reaction product of the following monomers:
    (a) a dihydric alcohol;
    (b) an aromatic dicarboxy compound selected from an aromatic dicarboxylic acid, aromatic dicarboxylic ($C_{1-3}$)alkyl ester, or a combination thereof; and
    (c) an adipic acid;

wherein the composition further consists of 0 to 1.5 wt. % of a residue of an addition copolymer, a titanium-containing catalyst, and 300 to 450 ppm of a post-polymerization catalyst quenching color reducing compound selected from a $C_{5-12}$ compounds having at least three —OH groups and combinations thereof;

wherein the aliphatic-aromatic copolyester has a number average molecular weight of at least 30,000 Daltons and a polydispersity index from 2 to less than 6;

wherein the copolyester composition exhibits an L* value that is 80 to 100 as determined by a colorimeter using $D_{65}$ illumination; and wherein the composition is made by a process comprising polymerizing the monomers to obtain molten copolyester, subsequently combining the color reducing compound with the molten copolyester, and cooling the molten copolyester to obtain said biodegradable aliphatic-aromatic copolyester composition.

2. The copolyester composition of claim 1, wherein the aromatic dicarboxylic ester groups comprise the polymerization product of terephthalic acid and the dihydric alcohol.

3. The copolyester composition of claim 1, wherein the aromatic dicarboxylic ester groups comprise the polymerization product of dimethyl terephthalate derived from recycled PET and the dihydric alcohol, and further wherein the copolyester further comprises a dimethyl terephthalate residual composition.

4. The copolyester composition of claim 3, wherein the dimethyl terephthalate residual composition comprises
    (a) dimethyl terephthalate
    (b) more than 0 to less than 10 wt % of a residual component selected from dimethyl isophthalate, cyclohexane dimethanol, diethylene glycol, triethylene glycol, and a combination thereof.

5. The copolyester composition of claim 1, wherein the dihydric alcohol is selected from ethylene glycol, 1,2-propylene glycol, 1,3-propylene glycol, 1,2-butanediol, 2,3-butanediol, 1,4-butanediol, tetramethyl cyclobutanediol, isosorbide, hexylene glycol, 1,3-cyclohexanedimethanol isomers, 1,4-cyclohexanedimethanol isomers, a bio-derived diol, or a combination thereof.

6. The copolyester composition of claim 1, wherein the dihydric alcohol is selected from 1,4-butanediol, 1,3-propanediol, ethylene glycol, and combinations thereof.

7. The copolyester composition of claim 1, wherein the aromatic dicarboxylic acid is selected from terephthalic acid or di($C_{1-3}$)alkyl ester thereof, isophthalic acid or di($C_{1-3}$)alkyl ester thereof, naphthalic acid or di($C_{1-3}$)alkyl ester thereof, and a combination thereof.

8. The copolyester composition of claim 1, wherein the aromatic dicarboxylic acid group is derived from terephthalic acid or di($C_{1-3}$)alkyl ester thereof.

9. The copolyester composition of claim 5, further comprising isophthalic acid groups.

10. The copolyester composition of claim 1, wherein the color-reducing compound is selected from sorbitol, mannitol, xylitol, pentaerythritol, ascorbic acid, and combinations thereof.

11. The copolyester composition of claim 1, wherein the color-reducing polyol is selected from sorbitol, mannitol, and combinations thereof.

12. The copolyester composition of claim 1, having a $T_g$ from −35° C. to 0° C. and a $T_m$ from 90° C. to 160° C.

13. A biodegradable composition, consisting of a combination of:
    (i) from more than 10 to 59.99 wt. %, based on the total weight of the composition, of the aliphatic aromatic copolyester composition of claim 1;
    (ii) from more than 40 to less than 89.99 wt. %, based on the total weight of the composition, of a second polymer selected from aliphatic polyesters, starches, aromatic polyesters, cycloaliphatic polyesters, polyesteramides, and combinations thereof; and
    (iii) from 0.01 to 5 wt. %, based on the total weight of the composition, of an additive selected from nucleating agents, antioxidants, UV stabilizers, plasticizers, epoxy compounds, melt strength additives, and combinations thereof;
    (iv) from 0.01 to 45 wt. %, based on the total weight of the composition, of an additive selected from alcohols, acetates, alcohol-acetate copolymers, and combinations thereof; and
    (v) from 0.01 to 2 wt. %, based on the weight of the composition, of an additive selected from crosslinkers, anti-aging agents, retrogradation agents, anti-blocking agents, water, odor-controlling agents, and combinations thereof.

14. The composition of claim 13, wherein the aliphatic polyester is selected from poly(lactic acid)s, poly(hydroxyalkanoate)s, poly(butylene succinate)s, poly(butylene adipate)s, poly(butylene succinate adipate)s, poly(caprolactone)s, and combinations thereof.

15. An article extruded, calendared, extrusion molded, blow molded, solvent cast or injection molded from the biodegradable composition of claim 13.

16. The article of claim 15, wherein the article is a film.

17. The film of claim 16, wherein the film is formed by extrusion molding or calendaring the biodegradable composition.

18. The copolyester composition of claim 1, wherein the color reducing compound is present in an amount such that, compared to its absence, the copolyester composition obtains the whiteness of exhibits said whiteness of at least L*=85 as determined using a colorimeter with $D_{65}$ illumination.

19. A biodegradable aliphatic-aromatic copolyester composition comprising a copolyester having aliphatic ester groups and aromatic dicarboxylic ester groups, wherein the copolyester is a polymerization reaction product of the following monomers:
    (a) dihydric alcohol selected from the group consisting of 1,2-butanediol, 1,2-butanediol, 1,2-butanediol and combinations thereof;
    (b) aromatic dicarboxy compound selected from the group consisting of terephthalic acid, ($C_{1-3}$)alkyl ester thereof, and combinations thereof; and
    (c) adipic acid;
    wherein the composition further comprises a titanium-containing catalyst and 300 to 450 ppm of a post-polymerization catalyst quenching color reducing compound that is selected from the group consisting of sorbitol, mannitol, xylitol, pentaerythritol, ascorbic acid, and combinations thereof;
    wherein the aliphatic-aromatic copolyester has a number average molecular weight of at least 30,000 Daltons and a polydispersity index from 2 to less than 6;
    wherein the copolyester composition exhibits an L* value that is 80 to 100 as determined by a colorimeter using $D_{65}$ illumination; and
    wherein the composition is made by a process comprising polymerizing the monomers to obtain molten copolyester, subsequently combining the color reducing compound with the molten copolyester, and cooling the molten copolyester to obtain said biodegradable aliphatic-aromatic copolyester composition;
    wherein the copolyester composition excludes a second polymer selected from the group consisting of aliphatic polyesters, aliphatic polycarbonates, starches, aromatic polyesters, cycloaliphatic polyesters, polyesteramides, aromatic polycarbonates, and combinations thereof.

20. The biodegradable aliphatic-aromatic copolyester composition of claim 19 wherein the post-polymerization catalyst quenching-color reducing compound, is selected from the group consisting of sorbitol, mannitol, and xylitol.

* * * * *